US010140721B2

(12) United States Patent
Tsai et al.

(10) Patent No.: US 10,140,721 B2
(45) Date of Patent: Nov. 27, 2018

(54) MECHANICAL SYSTEM ON COMPUTER WITH ROTATIONAL PROJECTOR AND REALSENSE™ CAMERA

(71) Applicant: Intel Corporation, Santa Clara, CA (US)

(72) Inventors: Simon Tsai, Taoyuan County (TW); Jeff Ku, Taipei (TW); Gavin Sung, Taipei (TW); Paul M. Zagacki, Lake Oswego, OR (US); Tim Liu, New Taipei (TW); Ivan By Wang, Taipei (TW); Christopher J. Hamlin, Taipei (TW)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 15/199,987

(22) Filed: Jul. 1, 2016

(65) Prior Publication Data

US 2018/0005397 A1 Jan. 4, 2018

(51) Int. Cl.

| G06K 9/00 | (2006.01) |
|---|---|
| G06T 7/50 | (2017.01) |
| H04N 5/225 | (2006.01) |
| H04N 5/33 | (2006.01) |
| G06T 7/40 | (2017.01) |
| G06T 7/80 | (2017.01) |

(52) U.S. Cl.
CPC .............. *G06T 7/50* (2017.01); *G06T 7/40* (2013.01); *G06T 7/80* (2017.01); *H04N 5/225* (2013.01); *H04N 5/2252* (2013.01); *H04N 5/332* (2013.01)

(58) Field of Classification Search
CPC .... G06T 7/50; G06T 7/40; G06T 7/80; H04N 5/225; H04N 5/2252; H04N 5/332
See application file for complete search history.

(56) References Cited

U.S. PATENT DOCUMENTS

2007/0263176 A1* 11/2007 Nozaki et al. ......... G03B 21/14
353/69

OTHER PUBLICATIONS

Colleen Culbertson., "Introducing the Intel RealSense R200 Camera (world facing)," Internet Item, Jun. 25, 2016, 4 pages, Intel Corporation, Santa Clara, CA.
(Continued)

*Primary Examiner* — Tom Y Lu
(74) *Attorney, Agent, or Firm* — Spectrum IP Law Group LLC

(57) ABSTRACT

Methods and apparatus relating to a mechanical system on computer with rotational projector and RealSense™ camera are described. In an embodiment, a device includes three portions: a first portion to comprise a projector; a second portion to comprise a camera; and a third portion to comprise one or more computing system components. At least the first and second portions are rotationally engaged to allow for independent rotation of the first portion and the second portion. Other embodiments are also disclosed and claimed.

21 Claims, 17 Drawing Sheets

(56) References Cited

OTHER PUBLICATIONS

"Take Interaction to the Next Level; Intel RealSense Camera F200," Internet Item, retrieved from http://www.intel.com/content/www/us/en/architecture-and-technology/realsense-shortrange.html, Jun. 14, 2016, 10 pages, Intel corporation, Santa Clara, CA.
Amazon, "Amazon Echo," Internet Item, retrieved from https://www.amazon.com/Amazon-Echo-Bluetooth-Speaker-with-WiFi-Alexa/dp/B00X4WHP5E/ref=sr_1_1?ie=UTF8&qid=1466879143&sr=8-1&keyword, Jun. 25, 2016, 7 pages.
"Amazon Tap—Alexa-Enabled Portable Bluetooth Speaker," Internet Item, retrieved from https://www.amazon.com/gp/product/B01BH83OOM/red-s9_simh_gw_g451_i4_r?ie=UTF8&fpl=fresh&pf_rd_m=ATVPDKIKX0DER&pf_rd_s=desktop, Jun. 25, 2016, 11 pages.

\* cited by examiner

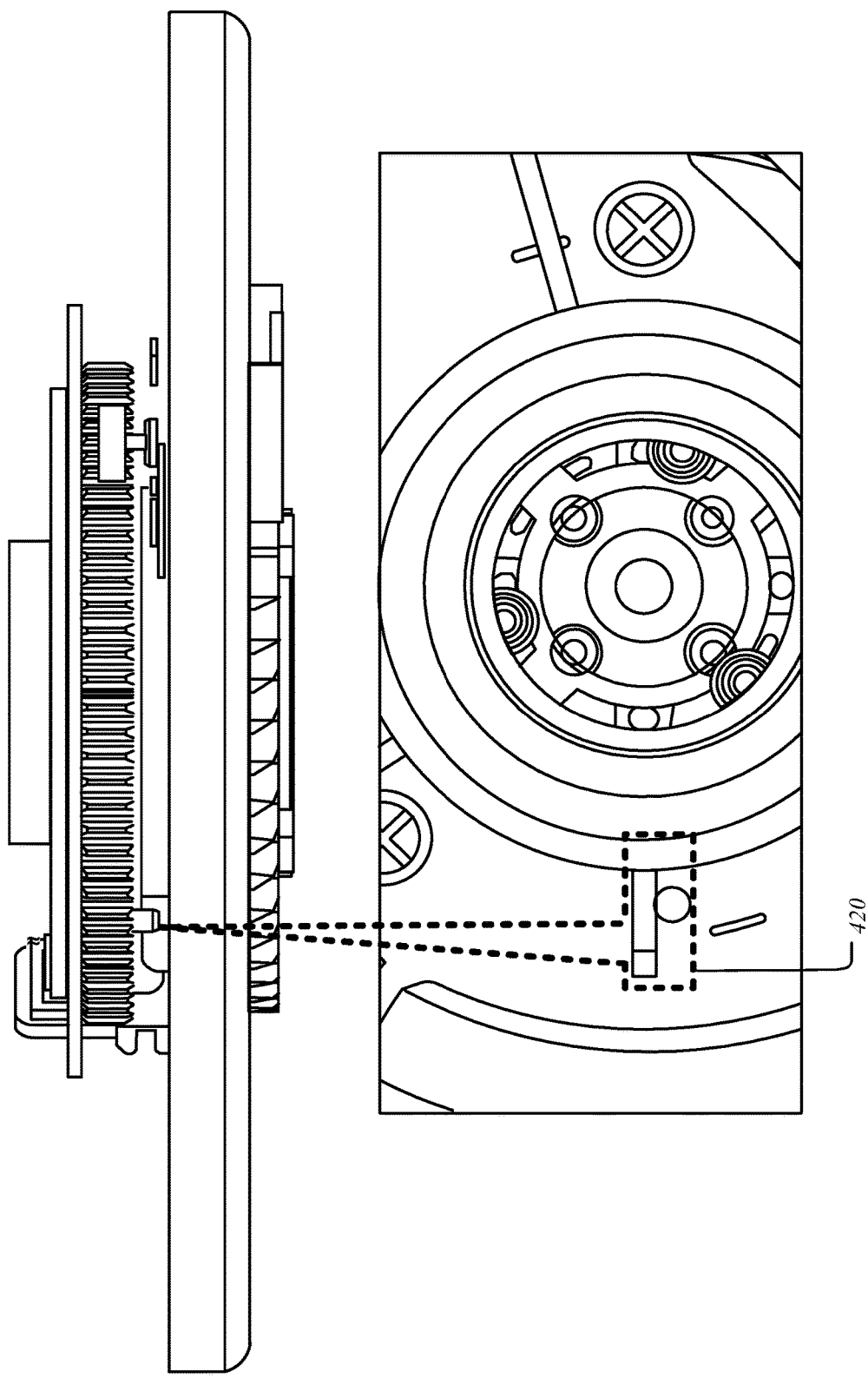
FIG. 4B1

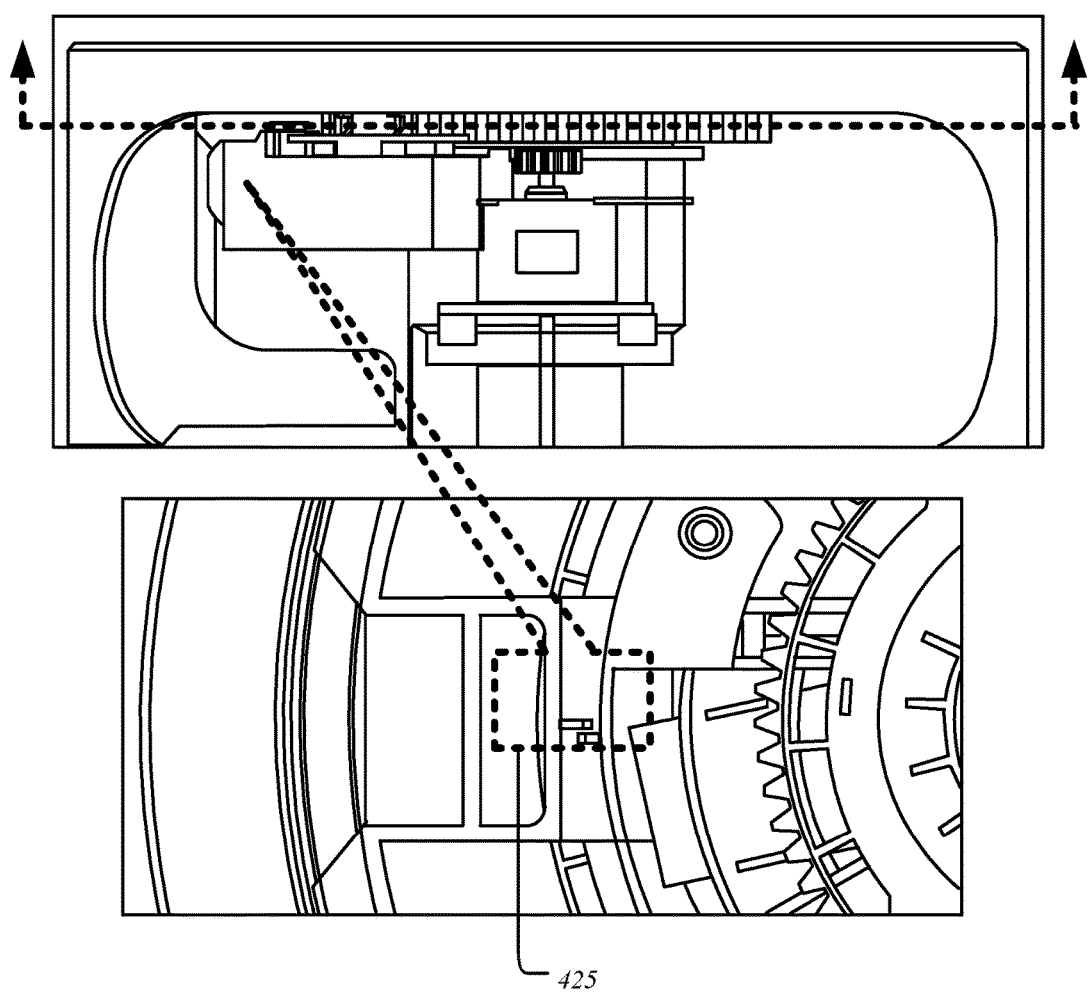
FIG. 4B2

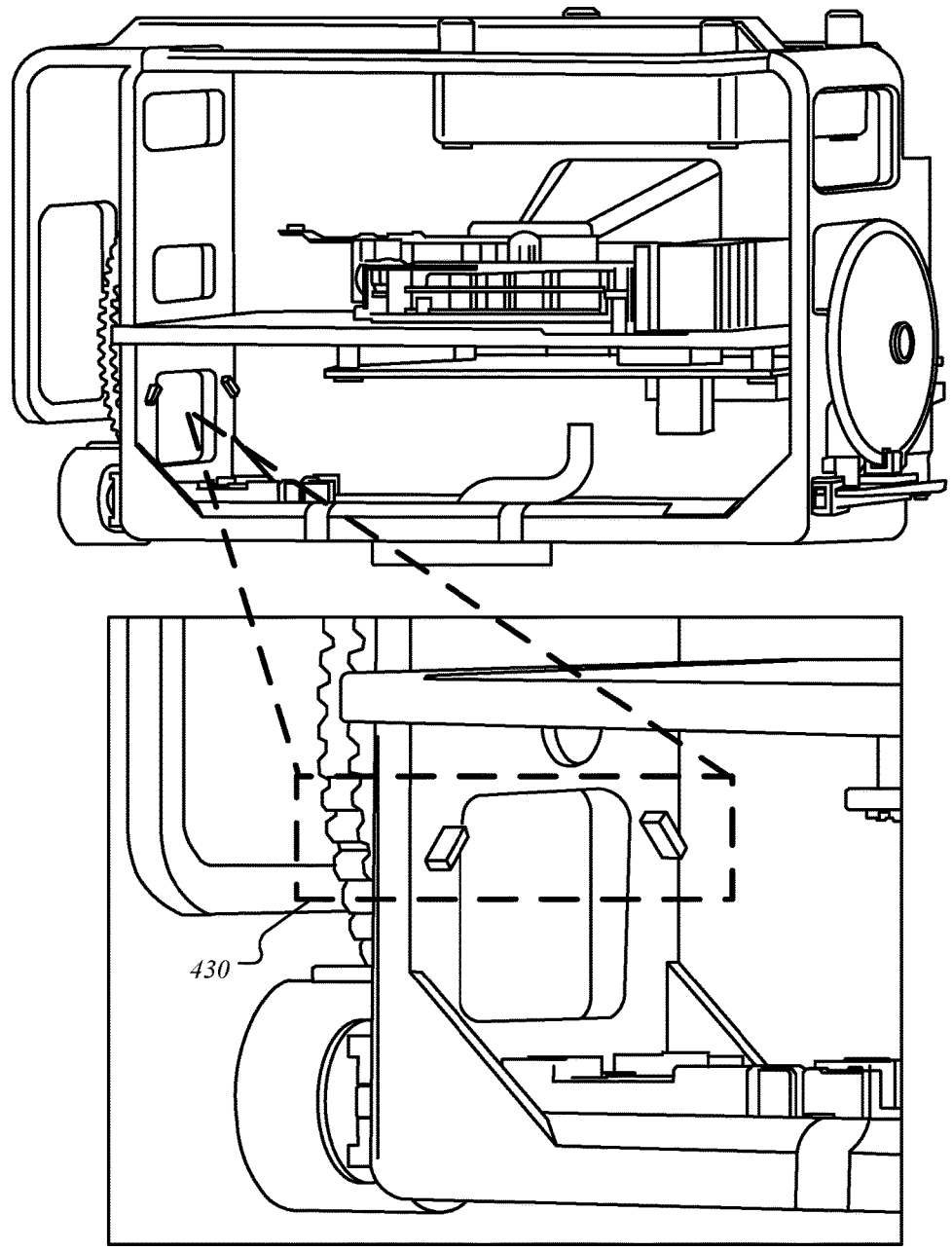
FIG. 4B3

MECHANICAL SYSTEM ON COMPUTER WITH ROTATIONAL PROJECTOR AND REALSENSE™ CAMERA

FIELD

The present disclosure generally relates to the field of electronics. More particularly, one or more embodiments relate to a mechanical system on computer with rotational projector and RealSense™ camera.

BACKGROUND

Relatively recently, several stand-alone devices that can interact and communicate with users have entered the market, e.g., due to improvements in technology and lower component costs. A couple of such examples include Alexa™ and Echo™ devices provided by Amazon™, Inc. However, such devices generally communicate with users only through voice interaction.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 4B, 4B1, 4B2, and 4B3 illustrate detailed perspective and side views of mechanical stops for cable protection, according to some embodiments.

DETAILED DESCRIPTION

Figure 1A:
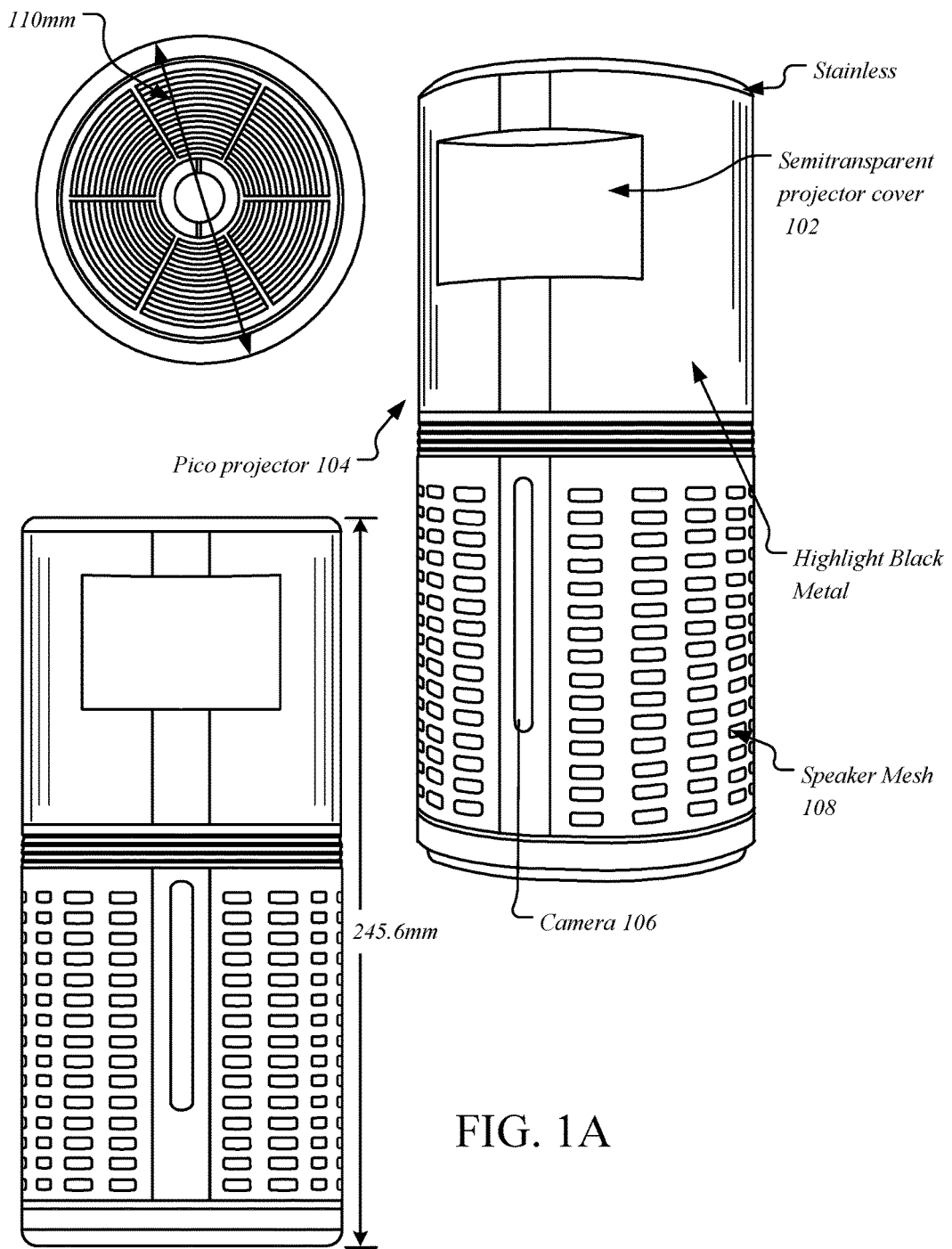
FIG. 1A illustrates various views of an industrial design for a device with a projector and computing functionality, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Due to improvements in technology and lower component costs, several stand-alone devices that are capable to interact with users have entered the market. Most such devices, however, rely on voice communication. One new device is a camera provided by Intel® Corporation. More particularly, the RealSense™ Camera F200 is three cameras in one—a 1080p HD camera, an infrared camera, and an infrared laser projector—to measure depth and enable the computer to read facial expressions and gestures and swap out backgrounds. It can be integrated into select all-in-ones, 2-in-1s, and laptops.

Some embodiments provide a mechanical system on computer with rotational projector and RealSense™ camera. In an embodiment, a computing device includes three components/portions that are stacked to form a single unit/device (see, e.g., FIG. 1A). The device may include a battery to allow it to be used as a portable/mobile device. The top portion includes a projector, the middle portion includes a camera, and the bottom portion includes one or more computing system components as will be further discussed herein, e.g., with reference to FIGS. 1A-8. In one embodiment, the three portions may be rotationally engaged to allow rotation of at least the top two portions (projector and camera) independent of each other and the bottom portion. The bottom portion may for example rest stationary on a horizontal surface (e.g., a desk or table) during operation of the device. This allows for the camera portion to rotate and capture images of the surrounding area, which may then be used to rotate the projector to a determined location for projection operations. Hence, two or more stepping motors may be used (e.g., one or more for moving the top/projector portion in vertical/horizontal axis and one motor for moving the middle/camera portion in the horizontal axis) in one or more embodiments.

Moreover, the projector may be a portable/mobile projector (also referred to as a Pico projector), which includes an image/video projector sufficiently small to fit into a handheld device, for example. The camera may be any type of a digital camera with image capture capability. The camera may be able to capture images in the visible spectrum (which includes the electromagnetic spectrum that is visible to the human eye, or at wavelengths between about 390 nm and 700 nm) and/or infrared wavelengths (e.g., radiated at wavelengths of between about 700 nm and 1 mm). Hence, a RealSense camera may be used for the middle portion of the device. The computing device components in the bottom portion may include computing system components such as one or more components discussed with reference to FIGS. 5-8 (including for example one or more processors (each having one or more processor cores), one or more graphics processing units, memory, projector driver circuitry, battery, wired/wireless communication device(s), one or more speakers, one or more microphones (which may be provided in any location on the device, and away from acoustically active components like a fan, a motor, etc.), power supply/converter, solar cells (e.g., to generate power and/or charge the battery), one or more input buttons, etc.).

Also, since one or more of the computing system components may generate heat, at least one surface of the bottom portion (any surface facing exposed to the perimeter of the device to allow for exchange of heat) may be used as a heat sink to dissipate the heat generated by the component(s). Furthermore, one or more of the components in the bottom portion of the device may be included on the same integrated circuit device (e.g., to form a System on Chip (SOC)) as discussed further with reference to FIGS. 5-8.

FIG. 1A illustrates various views of an industrial design for a device with a projector and computing functionality, according to an embodiment. As shown, the top portion may be about 110 mm in diameter (e.g., with a stainless ring) and the height of the device may be about 245.6 mm. The top portion includes a semitransparent projector cover 102, e.g., to protect the projector 104 elements from the environment and/or for optically filtering the projector light (e.g., for color correction, magnification, etc.). The body of the device may be in highlight black metal or other material. The camera 106 may be exposed on one side of the device (or potentially more than one camera may be used exposed on more than one side to speed up the image capture or scanning operations). One or more speakers may be provided in one or more portions of the device, e.g., top, middle, and/or bottom (of which FIG. 1A only shows the speaker mesh 108 in the middle portion).

Figure 1B:
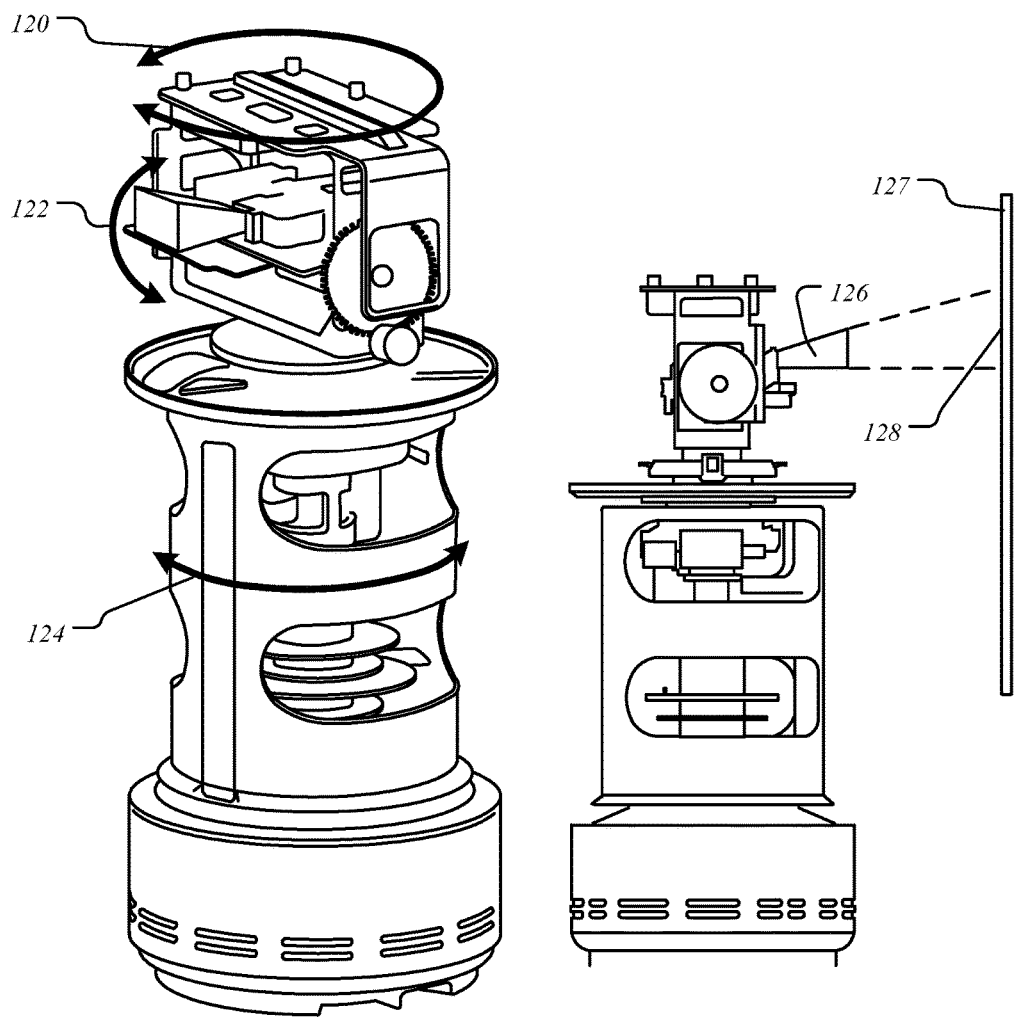
FIGS. 1B, 2A, and 2B illustrate perspective and side view of a device with a projector and computing functionality, according to some embodiments.

FIG. 1B illustrates perspective (on the left side of the figure) and side view (on the right side of the figure) of a device with a projector and computing functionality, according to some embodiments. As shown, the projector/top portion may have a full (or almost a full) range of horizontal rotation 120 (e.g., between about 350-360 degrees, which may be limited by one or more mechanical stops to ensure the internal wiring is not damaged or tangled due to excessive rotation in one direction, as will be further discussed with reference to FIGS. 4B, 4B1, 4B2, and 4B3). The projector/top portion may also have vertical range of rotation 122 (e.g., about 45 degrees). Additionally, the middle/camera portion may have almost a full (or almost a full) range of horizontal rotation 124 (e.g., about 350-360 degrees, which may be limited by one or more mechanical stops to ensure the internal wiring is not damaged or tangled due to excessive rotation in one direction, as will be further discussed with reference to FIGS. 4B, 4B1, 4B2, and 4B3).

Referring to the right portion of FIG. 1B, the camera may scan the surrounding area (e.g., in a meeting room, at home, etc.) to determine a surface 127 for projection 126. Then, the projector portion may be rotated in vertical and/or horizontal directions towards the determined surface 128. Determination of the suitable surface may be done by logic coupled to the camera either locally (in the middle portion) or in the bottom/computing device portion of the device in various embodiments.

In one or more embodiments, logic that determines the projection surface 127 (e.g., one of the processors discussed with reference to FIGS. 5-8) analyzes the images that have been captured by the camera to determine the location of the projection surface by considering and/or prioritizing one or more of: one or more projection surface characteristics (such as flatness, color, reflectivity, etc.), distance between the projection surface and the projector (e.g., closer surfaces may be prioritized over farther surfaces, closer/farther surfaces may be picked based on target projection size (e.g., where farther surfaces would render a larger projector image), etc.), presence of obstructions on the light path between the projector and the projection surface, presence of objects or writing on the projection surface, etc.

Figure 2A:
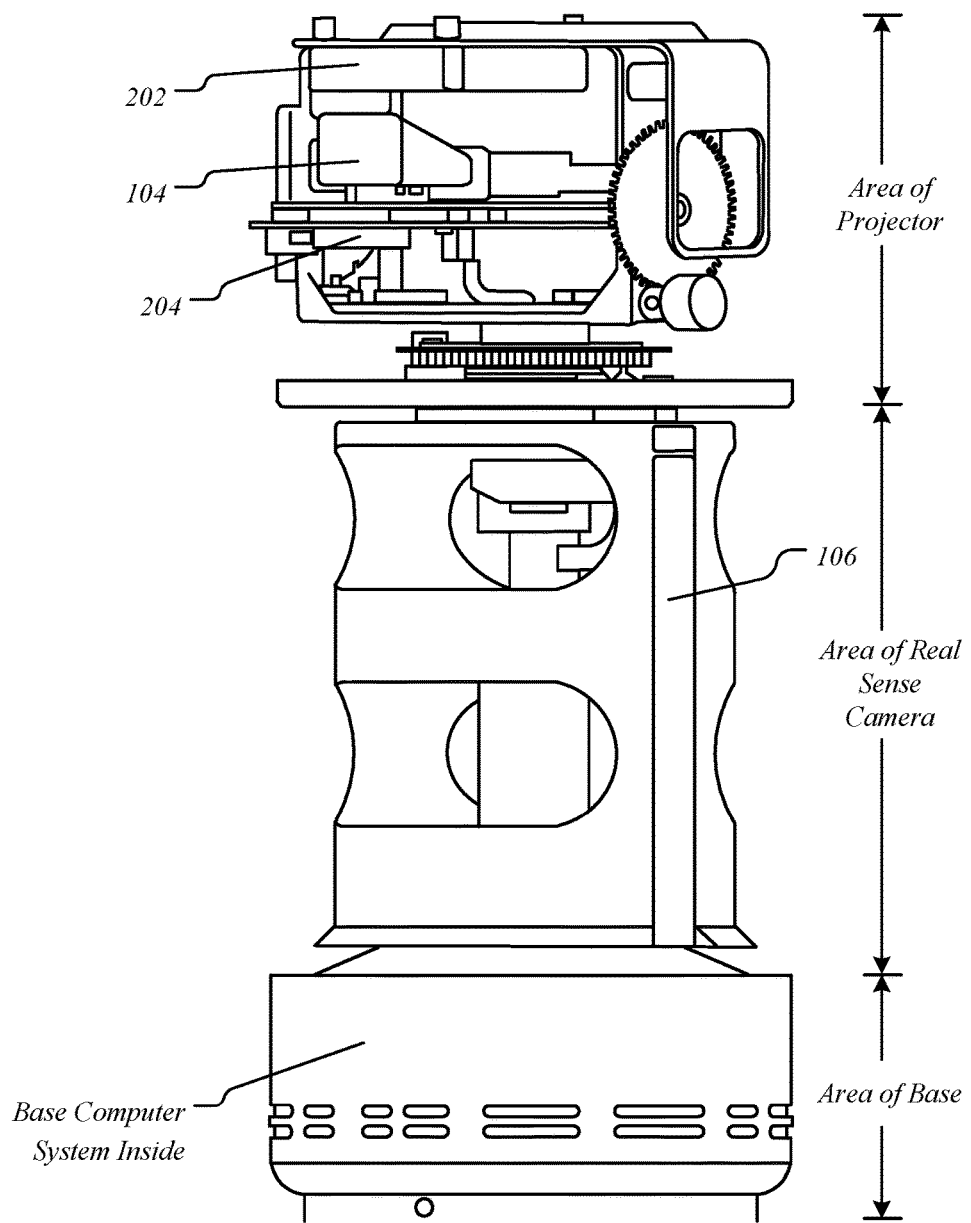

FIG. 2A illustrates a side view of a device with a projector and computing functionality, according to an embodiment. The device may include one or more fans 202, e.g., to cool the Light Emitting Diode(s) (LEDs) of the projector. Also, a control board 204 may provide various control signals to the mechanism (e.g., including one or more motors and/or gears) that rotate the projector in vertical/horizontal axis. Moreover, the control board 204 may include logic to control the motion of the projector and/or the brightness/operation of the projector.

Figure 2B:
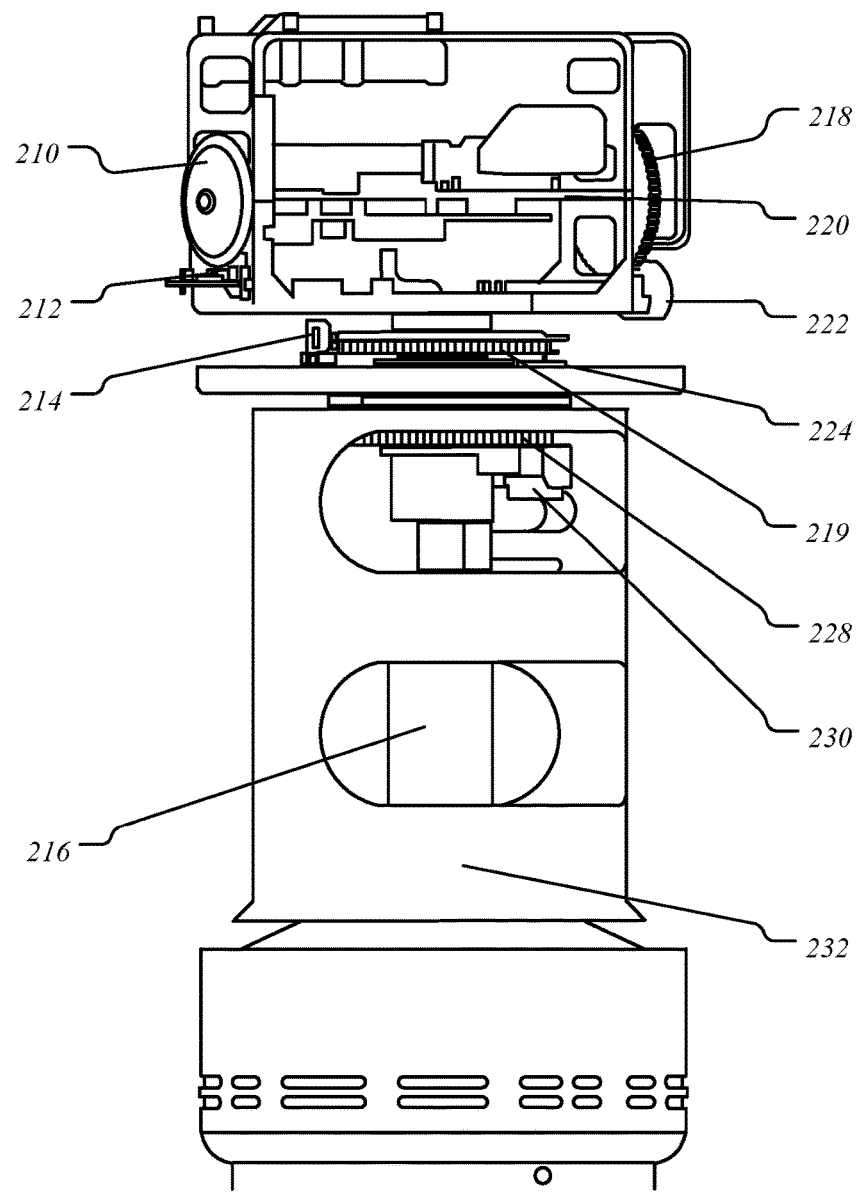

FIG. 2B illustrates a side view of a device with a projector and computing functionality, according to an embodiment. The top/projector portion includes a (e.g., black) disk 210 with an open slot for a photo interrupter sensor. The disks discussed herein that include a slot may be made of metal, hard plastic, etc. Generally, as discussed herein, a photo interrupter sensor refers to a transmission-type photo sensor that integrates optical receiving and transmitting elements in a single package. The photo interrupter sensor may detect the open slot of the disk to determine the vertical location of the projector 212. A horizontal photo interrupter sensor 214 may also be used to detect the position of the projector.

As shown in FIG. 2B, a mechanical main structure 216 maintains the coupling between the top, middle, and bottom portions to keep the portions together during rotation of the top/middle portions. A vertical gear 218 and horizontal gear 219 facilitates rotation of the projector/top portion. A mechanical carrier 220 may provide a platform for installation of the projector. a vertical stepping motor 222 is coupled to the vertical gear 218 to cause vertical location of the projector/top portion of the device. A gear 228 is coupled to a stepping motor 230 to rotate the camera/middle portion of the device in the horizontal axis. A carrier 232 may provide a mounting structure for the camera.

Figure 3A:
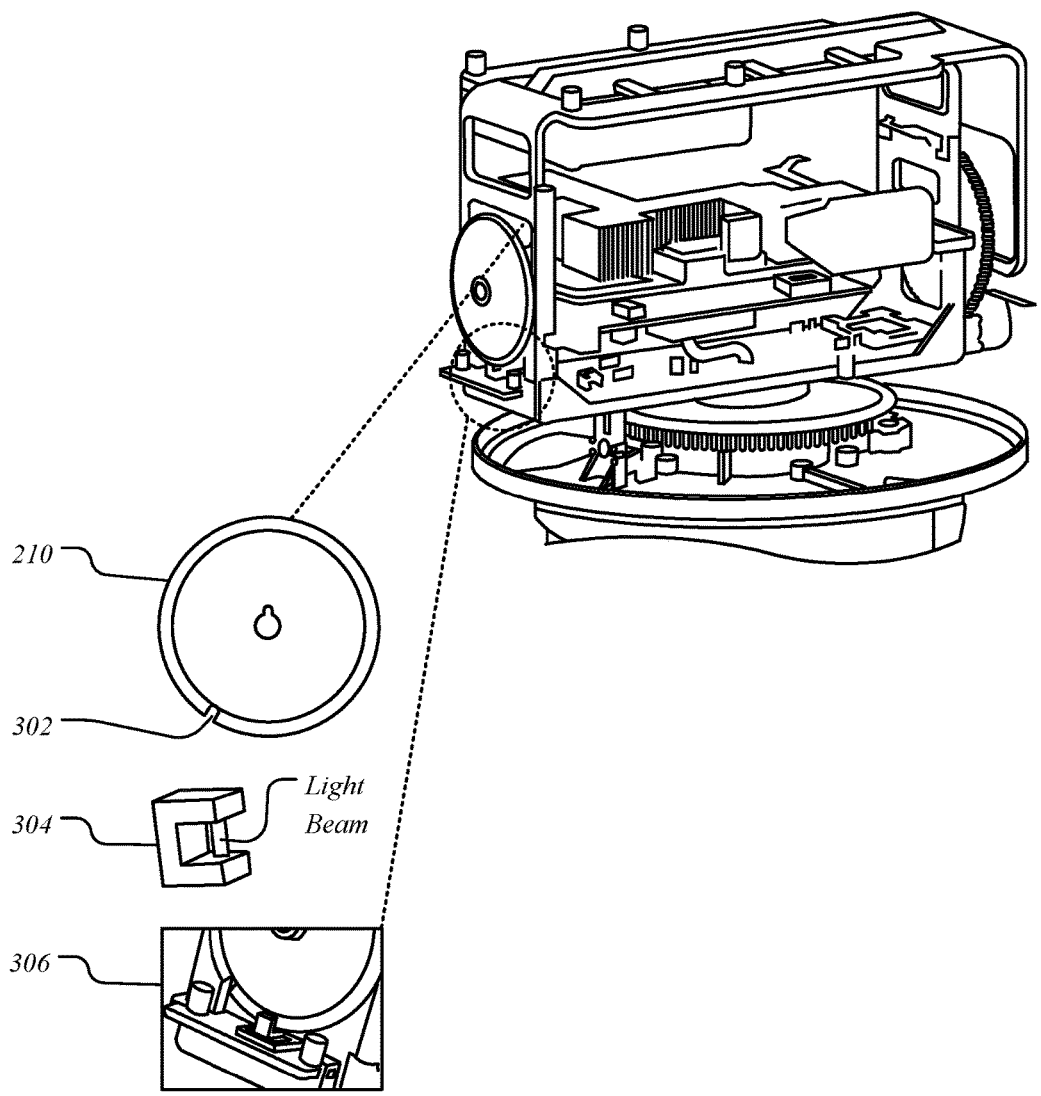
FIGS. 3A and 3B illustrate detailed views of a reference position detection mechanism for a projector's vertical/horizontal rotation, according to some embodiments.

FIG. 3A illustrates a detailed view of a reference position detection mechanism for a projector's vertical rotation, according to an embodiment. The open slot 302 of the disk in conjunction with the photo interrupter sensor 304 can detect the vertical rotational position of the projector. For example, a (e.g., red) light beam (generated by the photo interrupter sensor 304) may be used to detect the passage of the open slot 302 to provide an on/off judgment 306. The configuration of FIG. 3A allows for determination of the zero position of the projector each time the system is turned on (or a scan is initiated). The photo interrupter sensor 306 detects passage of the open slot 302 to determine the zero/reference vertical position of the projector.

Figure 3B:
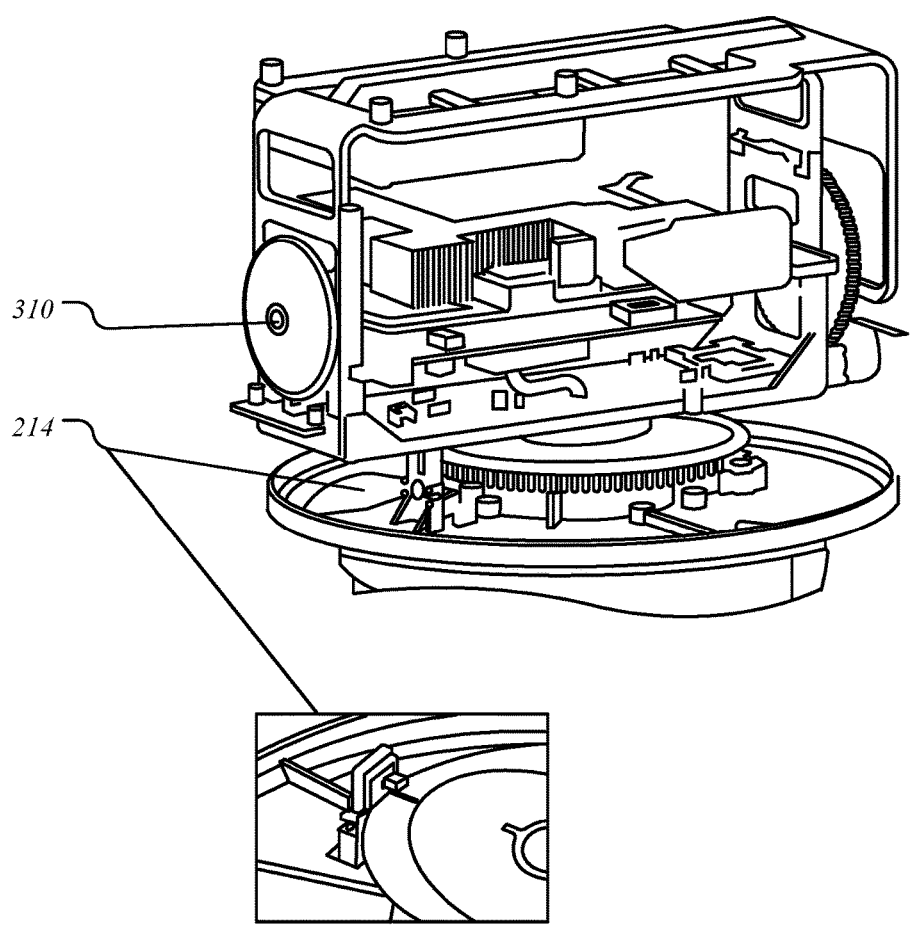

FIG. 3B illustrates a detailed view of a reference position detection mechanism for a projector's horizontal rotation, according to an embodiment. The open slot of a (e.g., black) disk 310 in conjunction with a photo interrupter sensor 214 can detect the horizontal rotational position of the projector. For example, a light beam (generated by the photo interrupter sensor 214) may be used to detect the passage of the open slot of the disk 310 to provide an on/off judgment. The configuration of FIG. 3B allows for determination of the reference/zero position of the projector each time the system is turned on (or a scan is initiated). The photo interrupter sensor 214 detects passage of the open slot of the disk 310 to determine the zero/reference horizontal position of the projector.

Figure 3C:
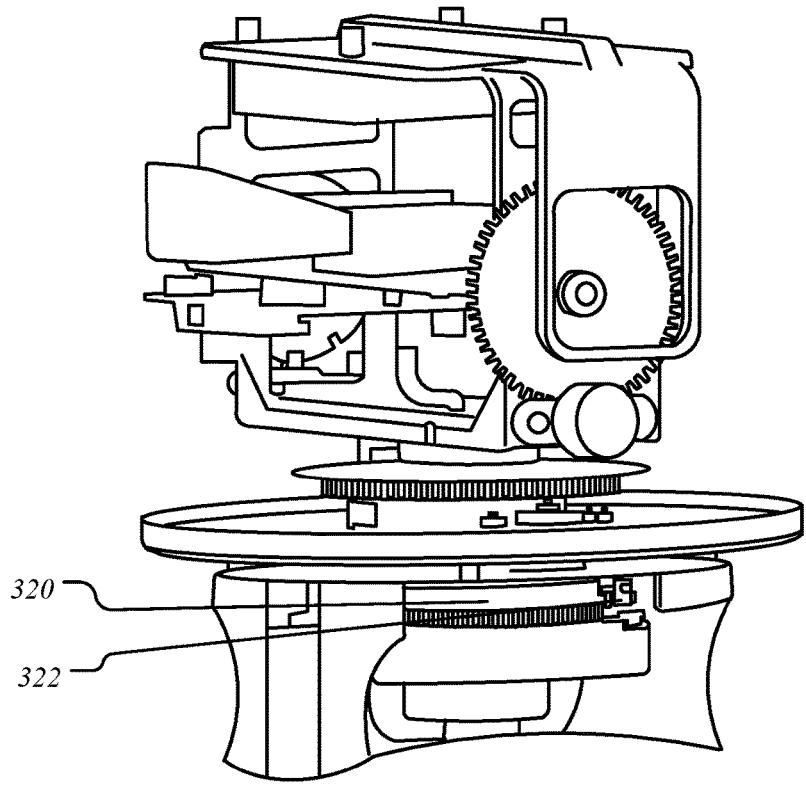
FIG. 3C illustrates a detailed view of a reference position detection mechanism for a camera's horizontal rotation, according to an embodiment.

FIG. 3C illustrates a detailed view of a reference position detection mechanism for a camera's horizontal rotation, according to an embodiment. The open slot of a (e.g., black) disk 320 in conjunction with a photo interrupter sensor 322 can detect the horizontal rotational position of the camera. For example, a light beam (generated by the photo interrupter sensor 322) may be used to detect the passage of the open slot of the disk 320 to provide an on/off judgment. The configuration of FIG. 3C allows for determination of the reference/zero position of the camera each time the system is turned on (or a scan is initiated). The photo interrupter sensor 322 detects passage of the open slot of the disk 320 to determine the zero/reference horizontal position of the camera.

Figure 4A:
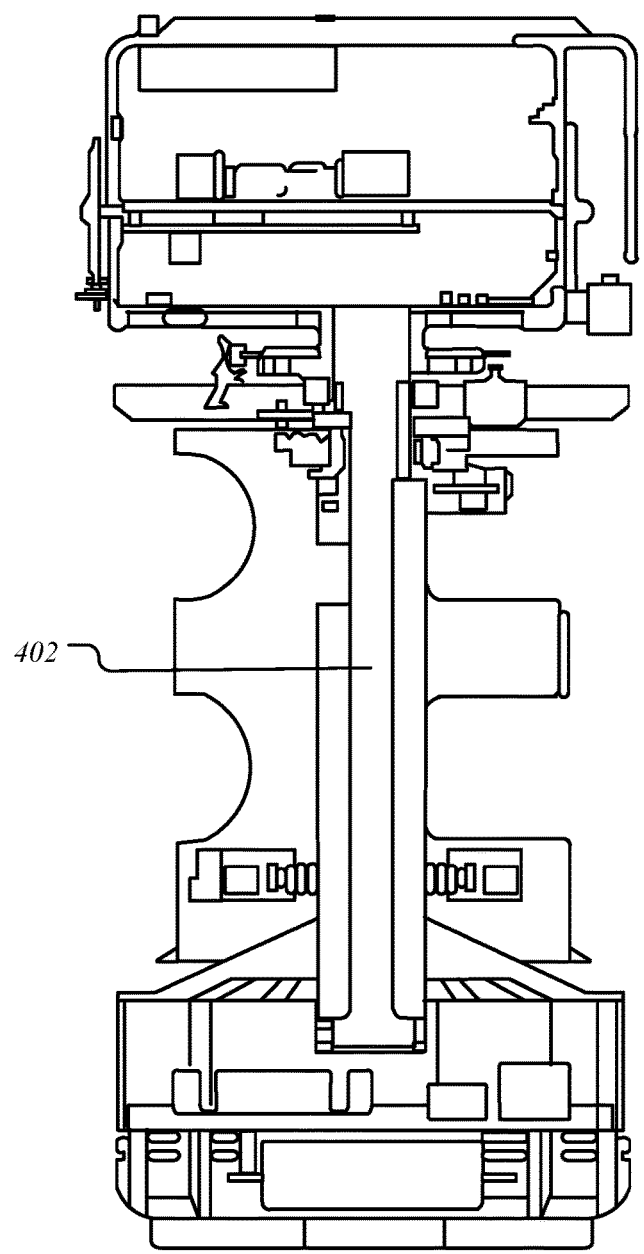
FIG. 4A illustrates a side view of a cable routing path for a device with a projector and computing functionality, according to an embodiment.

FIG. 4A illustrates a side view of a cable routing path for a device with a projector and computing functionality, according to an embodiment. For example, a hollow tube 402 (e.g., made of plastic or metal) may be provided from the base/bottom portion of the device to the projector/top portion of the device. The hollow tube 402 may pass cables/wires for transmission of power or signals for one or more of the: projector, camera, motor(s), photo sensor(s), microphone(s), speaker(s), or other components of the device discussed herein. In an embodiment, the hollow tube 402 may be provided as part of or inside the mechanical main structure 216 of FIG. 2B.

Figure 4B:
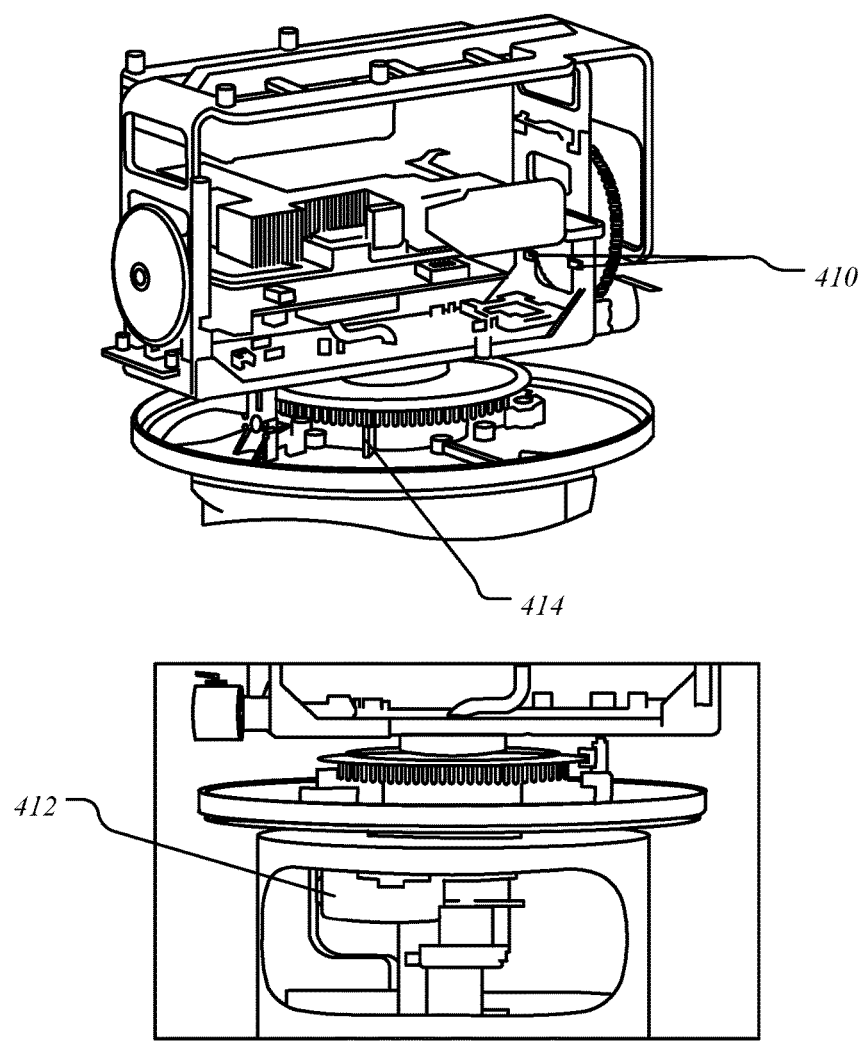

FIG. 4B illustrates a detailed perspective (on the left side of the figure) and side view (on the right side of the figure) of mechanical stops for cable protection, according to an embodiment. As show, three sets of mechanical stops 410, 412, and 414 may be used to limit rotation of projector vertical rotation, horizontal camera rotation, and/or projector horizontal rotation, respectively. Generally, mechanical stops provide protection to cables and mechanical mechanism by limiting the continuation of rotation in one direction and fix the rotation to a select angle.

FIGS. 4B, 4B1, 4B2, and 4B3 illustrate detailed perspective and side views of mechanical stops for cable protection, according to some embodiments, For example, FIG. 4B1 illustrates an example of a mechanical stop 420 for the horizontal rotation of the projector portion. The top portion of FIG. 4B1 shows a side view while the bottom portion shows a top view of the mechanical stop 414 shown in FIG. B. FIG. 4B2 illustrates an example of a mechanical stop 425 for the horizontal rotation of the camera portion. The top portion of FIG. 4B2 shows a side view while the bottom portion shows a top view of the mechanical stop 412 shown in FIG. B. FIG. 4B3 illustrates an example of a mechanical stop 430 for the vertical rotation of the projector portion. The top portion of FIG. 4B3 shows a perspective view and an exploded perspective view of the mechanical stop 410 shown in FIG. B.

While one or more embodiments discussed herein may utilize a mechanical stop, embodiments are not limited to mechanical stops. For example, in some other embodiments, a stop (e.g., to avoid tangling of cables when the rotating portions are rotated over a limit) may include a mechanical stop (such as shown in FIG. 4B) and/or other mechanisms including, for example, solenoid controlled stop/latch, electro-magnetic controlled stop/latch, gear control stop, etc. Moreover, if the cable tangling issues could be resolved (e.g., via wireless communication), the portions may be able to rotate freely, e.g., at any speed. Hence, in some embodiments, one or more of the portions/layers of the device may include their own power source (e.g., instead of sharing the power source from the bottom/computing system component portion) and communicate via wireless signals instead of wires/cables.

Figure 4C:
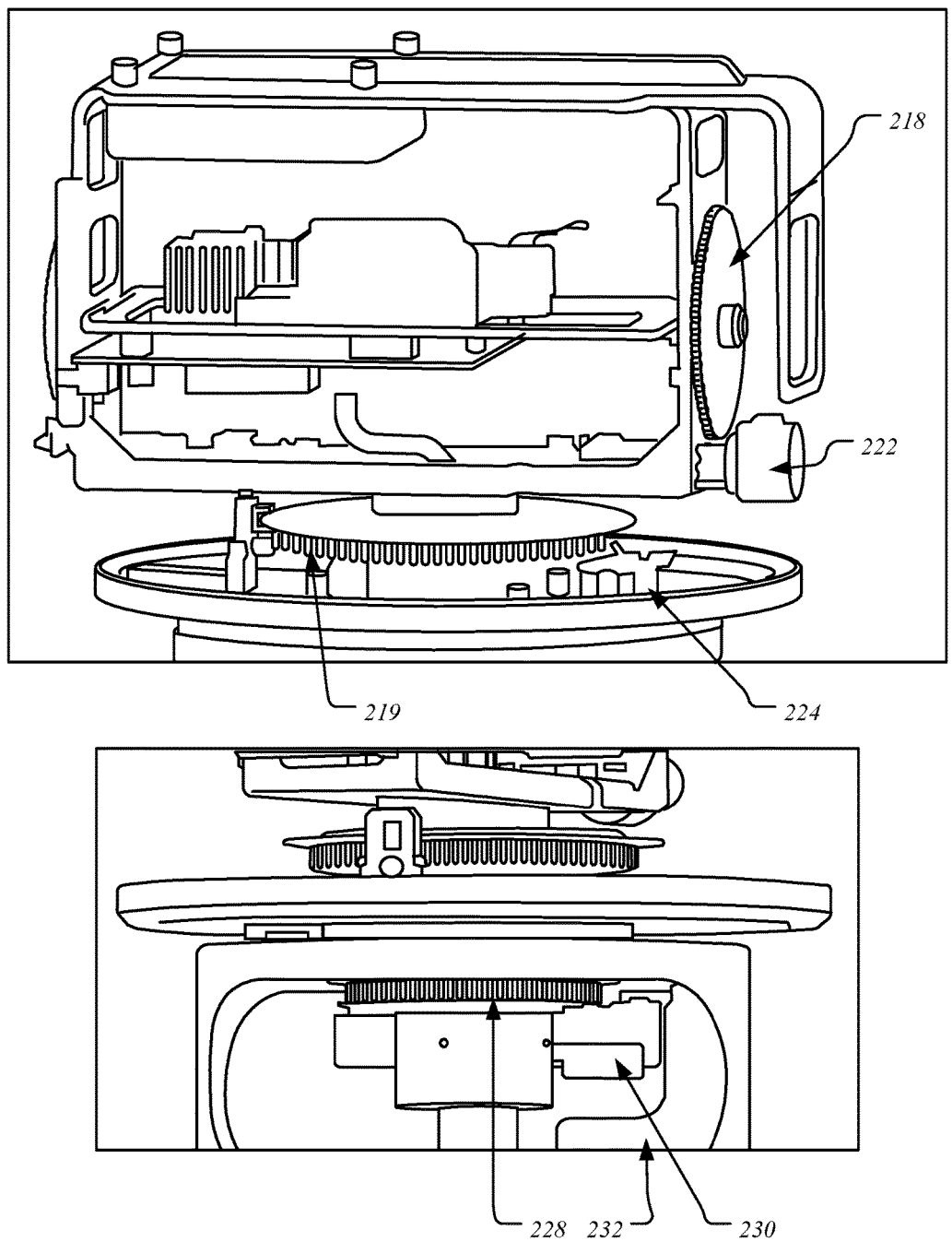
FIG. 4C illustrates a detailed side and perspective view of mechanical details of motors and gears, according to an embodiment.

FIG. 4C illustrates a detailed side (on the left side of the figure) and perspective view (on the right side of the figure) of mechanical details of motors and gears, according to an embodiment. Motor 230 engages gear 228 to cause rotation of the camera in the horizontal axis. The carrier 232 may mechanically link to the gear 228. Motors 222/224 engage gears 218/219 to provide vertical/horizontal projector rotation, respectively.

Furthermore, some embodiments may be applied in computing devices that include one or more processors (e.g., with one or more processor cores), such as those discussed with reference to FIGS. 5-8, including for example small form factor or mobile computing devices, e.g., a smartphone, tablet, UMPC (Ultra-Mobile Personal Computer), laptop computer, Ultrabook™ computing device, wearable devices (such as a smart watch, smart glasses, etc.), 2-in-1 systems, etc. However, embodiments discussed herein are not limited to mobile computing devices and may be applied in any type of computing device, such as a work station, a server, a super computer, etc. Also, some embodiments are applied in computing devices that include a cooling fan as well as fanless computing devices.

Figure 5:
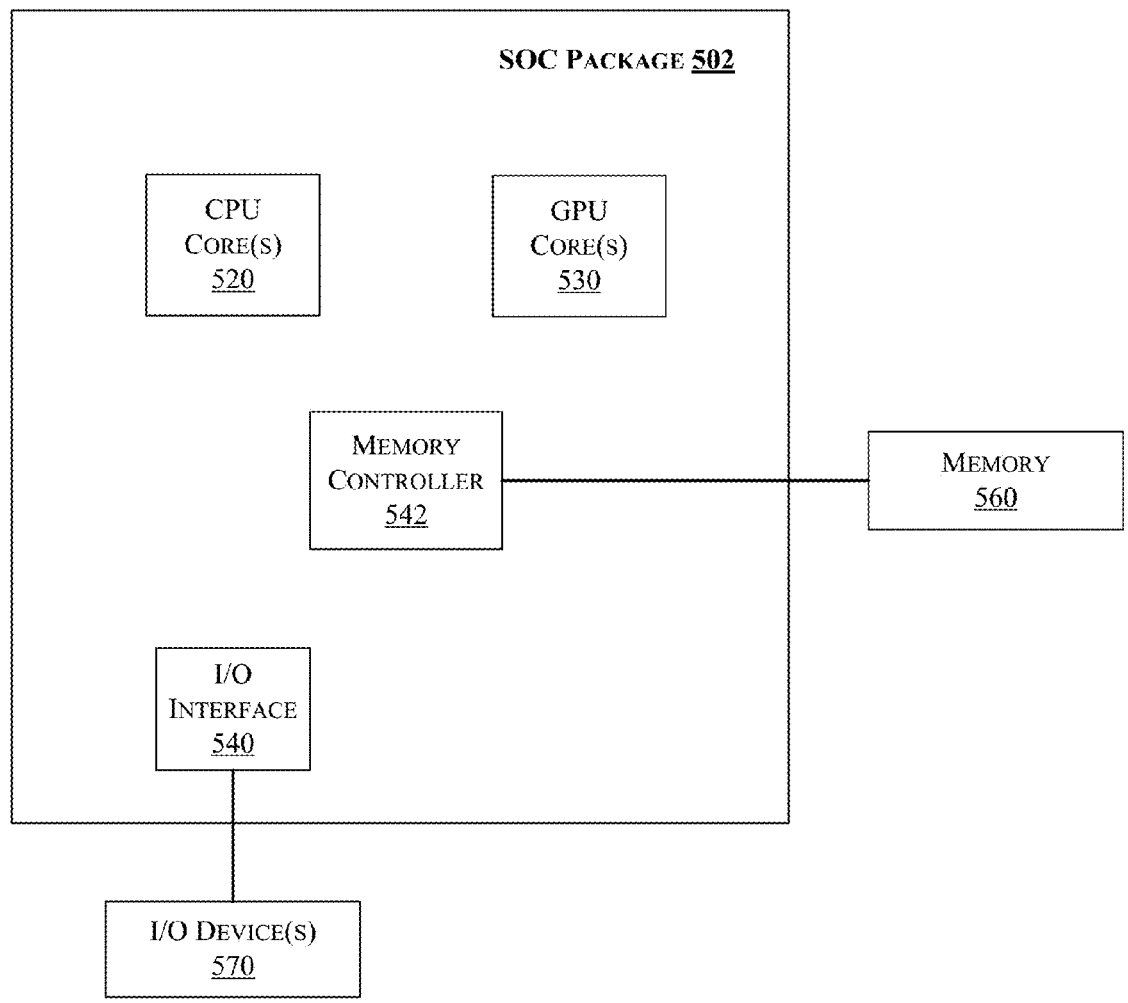
FIGS. 5 and 6 illustrate block diagrams of embodiments of computing systems, which may be utilized in various embodiments discussed herein.

Also, one or more of the components discussed herein can be embodied as a System On Chip (SOC) device. FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device (s) 570 may include one or more of a keyboard, a mouse, a touchpad, a display, an image/video capture device (such as a camera or camcorder/video recorder), a touch screen, a speaker, or the like.

Figure 6:
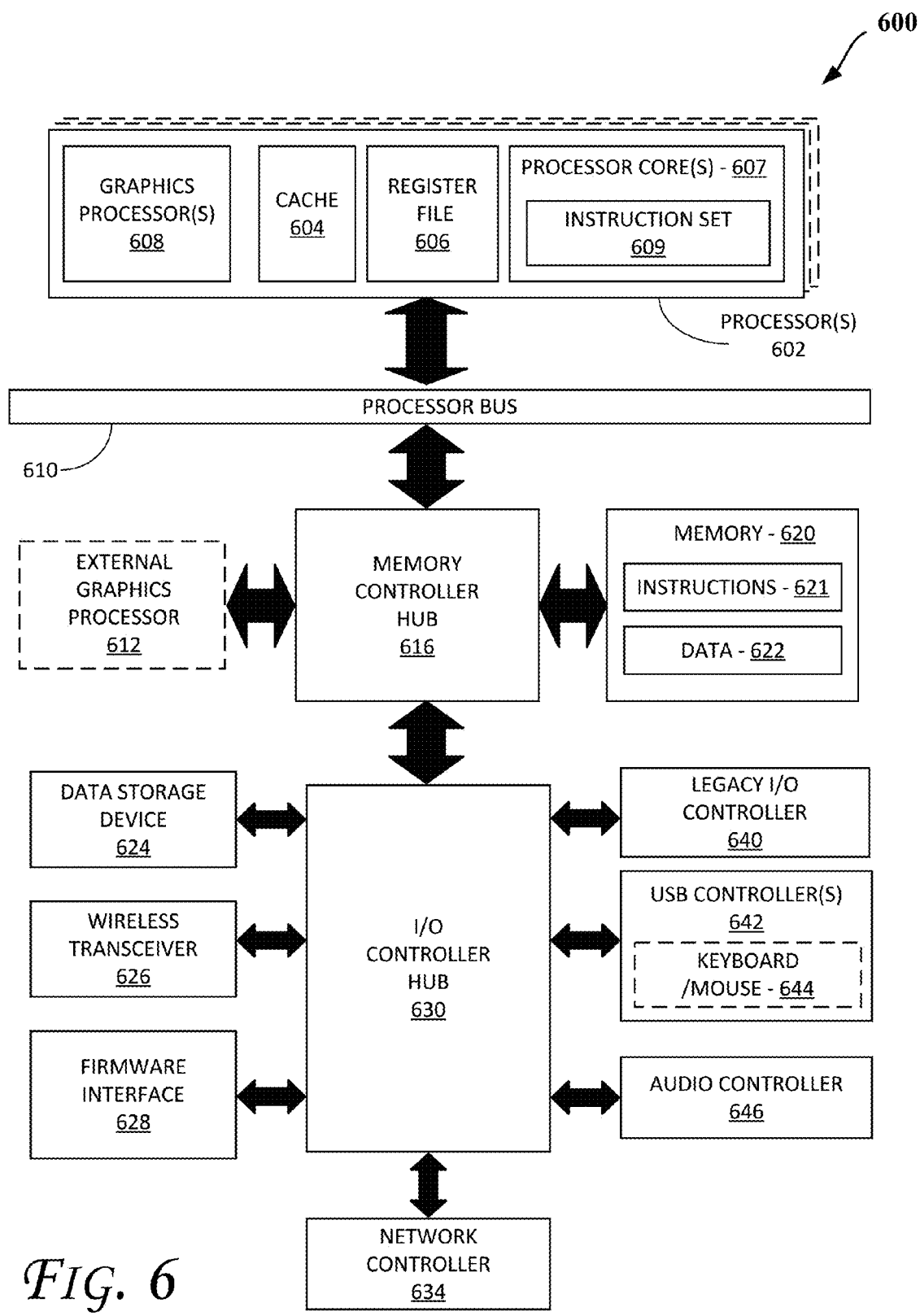

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
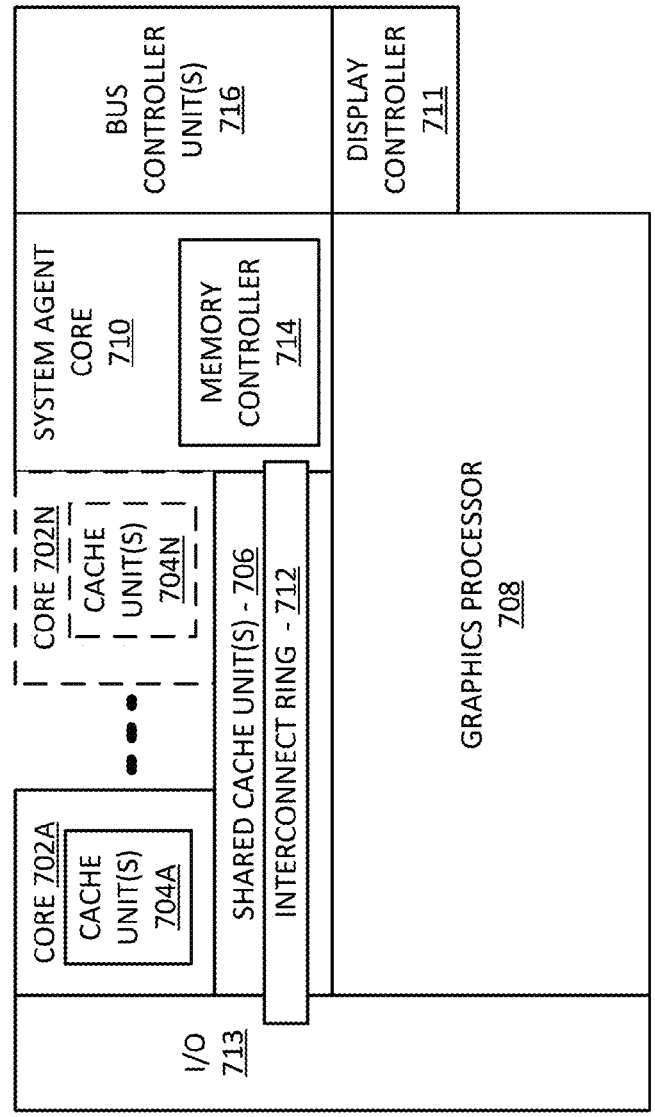
FIGS. 7 and 8 illustrate various components of processors in accordance with some embodiments.
Figure 7:
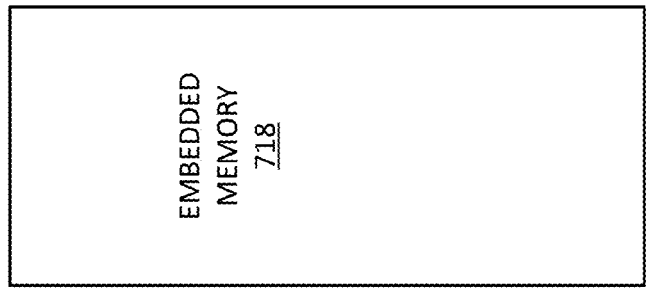

FIG. 7 is a block diagram of an embodiment of a processor 700 having one or more processor cores 702A-702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A-702N includes one or more internal cache units 704A-704N. In some embodiments each processor core also has access to one or more shared cached units 706.

The internal cache units 704A-704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A-704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A-702N include support for simultaneous multi-threading. In such embodiment, the system agent core 710 includes components for coordinating and operating cores 702A-702N during multi-threaded processing. System agent core 710 may additionally include a power control unit (PCU), which includes logic and components to regulate the power state of processor cores 702A-702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702-702N and graphics processor 708 use embedded memory modules 718 as a shared Last Level Cache.

In some embodiments, processor cores 702A-702N are homogenous cores executing the same instruction set architecture. In another embodiment, processor cores 702A-702N are heterogeneous in terms of instruction set architecture (ISA), where one or more of processor cores 702A-702N execute a first instruction set, while at least one of the other cores executes a subset of the first instruction set or a different instruction set. In one embodiment processor cores 702A-702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

Figure 8:
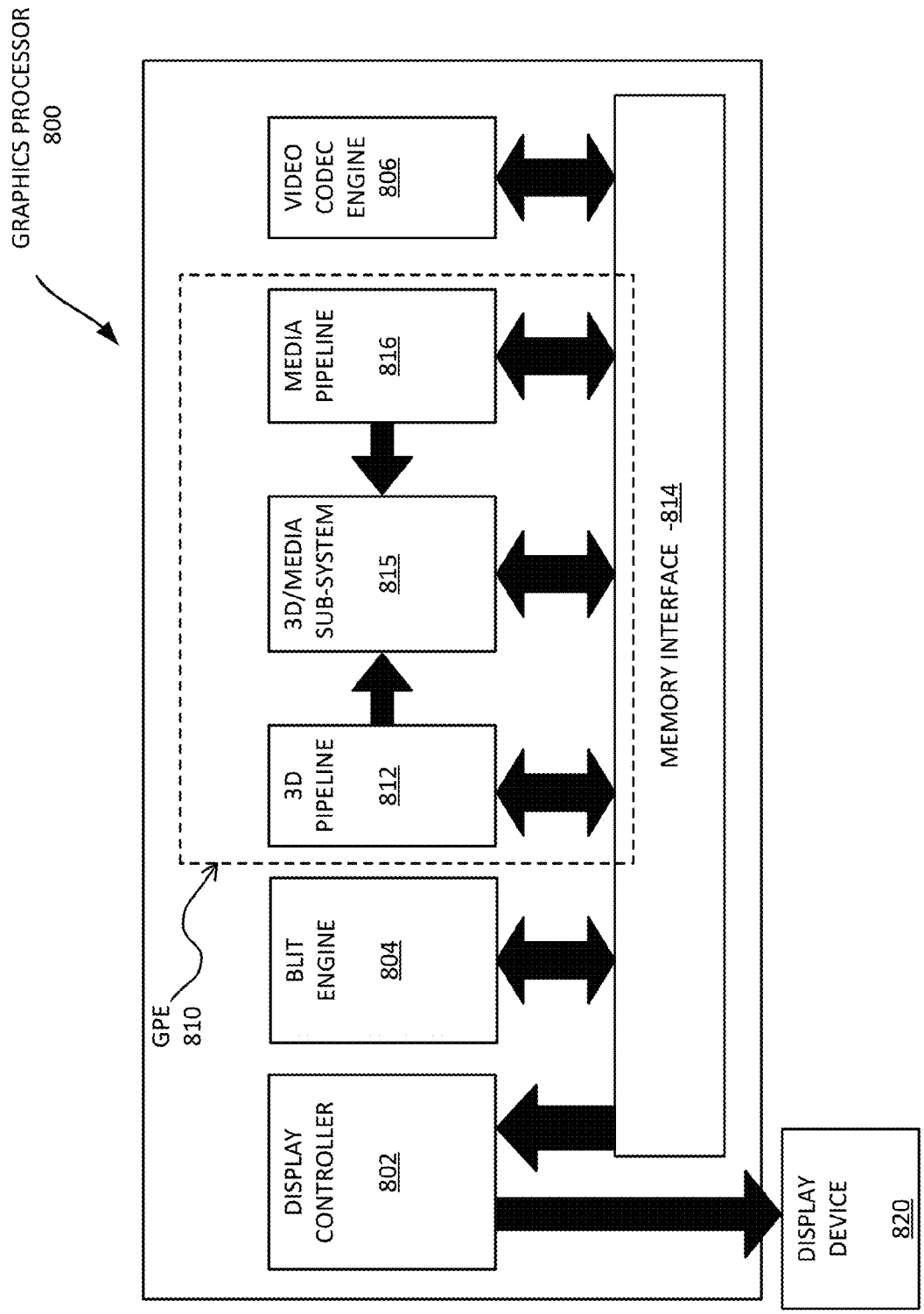

FIG. 8 is a block diagram of a graphics processor 800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 800 includes a memory interface 814 to access memory. Memory interface 814 can be an interface to local memory, one or more internal caches, one or more shared external caches, and/or to system memory.

In some embodiments, graphics processor 800 also includes a display controller 802 to drive display output data to a display device 820. Display controller 802 includes hardware for one or more overlay planes for the display and composition of multiple layers of video or user interface elements. In some embodiments, graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 800 includes a block image transfer (BLIT) engine 804 to perform two-dimensional (2D) rasterizer operations including, for example, bit-boundary block transfers. However, in one embodiment, 8D graphics operations are performed using one or more components of graphics processing engine (GPE) 810. In some embodiments, graphics processing engine 810 is a compute engine for performing graphics operations, including three-dimensional (3D) graphics operations and media operations.

In some embodiments, GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While 3D pipeline 812 can be used to perform media operations, an embodiment of GPE 810 also includes a media pipeline 816 that is specifically used to perform media operations, such as video post-processing and image enhancement.

In some embodiments, media pipeline 816 includes fixed function or programmable logic units to perform one or more specialized media operations, such as video decode acceleration, video de-interlacing, and video encode acceleration in place of, or on behalf of video codec engine 806. In some embodiments, media pipeline 816 additionally includes a thread spawning unit to spawn threads for execution on 3D/Media sub-system 815. The spawned threads perform computations for the media operations on one or more graphics execution units included in 3D/Media sub-system 815.

In some embodiments, 3D/Media subsystem 815 includes logic for executing threads spawned by 3D pipeline 812 and media pipeline 816. In one embodiment, the pipelines send thread execution requests to 3D/Media subsystem 815, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

The following examples pertain to further embodiments. Example 1 may optionally include an apparatus comprising: a first portion to comprise a projector; a second portion to comprise a camera; and a third portion to comprise one or more computing system components, wherein at least the first portion and the second portion are to be rotationally engaged to allow for independent rotation of the first portion and the second portion. Example 2 may optionally include the apparatus of example 1, comprising logic to determine a projection surface based at least in part on images of a surrounding area to be captured by the camera, wherein the logic is to cause adjustment to a location of the projector to cause projection of an image by the projector towards the determined projection surface. Example 3 may optionally include the apparatus of example 2, wherein the logic is to determine the projection surface based at least in part on analysis of one or more of: one or more projection surface characteristics, distance between the projection surface and the projector, presence of obstructions on a light path between the projector and the projection surface, and presence of objects or writing on the projection surface. Example 4 may optionally include the apparatus of example 1, wherein the first, second, and third portions are to be stacked with the second portion to be located between the first portion and the third portion. Example 5 may optionally include the apparatus of example 1, wherein the camera is to comprise a RealSense™ camera. Example 6 may optionally include the apparatus of example 1, wherein the projector is to comprise a portable projector. Example 7 may optionally include the apparatus of example 1, further comprising two or more stepping motors to cause rotation of the projector and the camera along a horizontal axis or a vertical axis. Example 8 may optionally include the apparatus of example 6, wherein the two or more stepping motors are to cause the rotation via engagement of two or more gears, wherein each of the two or more gears is to be coupled between one of the two or more stepping motors and a carrier for the camera or a carrier for the projector. Example 9 may optionally include the apparatus of example 1, further comprising a hollow tube to carry one or more wires between one or more of the first portion, the second portion, and the third portion, wherein the hollow tube is to be disposed in a central location of the first, second, and third portions to allow for relative rotation of the first portion and the second portion. Example 10 may optionally include the apparatus of example 1, further comprising a reference disk having an open slot, wherein rotation of the projector or the camera is to be detected at a photo interrupter sensor based at least in part on an open slot in a reference disk, wherein the reference disk is to rotate with the camera or the projector along a vertical axis or a horizontal axis. Example 11 may optionally include the apparatus of example 1, further comprising one or more stops to limit the rotation of the first portion or the second portion. Example 12 may optionally include the apparatus of example 1, further comprising one or more fans to cool a component of the projector or one of the one or more computing system components. Example 13 may optionally include the apparatus of example 1, wherein the third portion is to comprise a heatsink to dissipate heat generated by the one or more computing system components. Example 14 may optionally include the apparatus of example 1, further comprising a battery to supply electrical power to one or more of: the projector, the camera, and the one or more computing system components. Example 15 may optionally include the apparatus of example 1, wherein the first portion and the second portion are allowed to rotate along the same axis. Example 16 may optionally include the apparatus of example 1, wherein the third portion is to be stationary while the first portion or the second portion are rotated. Example 17 may optionally include the apparatus of example 1, wherein the one or more computing system components are to be selected from a group comprising: one or more processor cores, one or more graphics processing units, memory, projector driver circuitry, a battery, a wired or wireless communication device, a speaker, a microphone, a power supply or converter, solar cells, and one or more input buttons. Example 18 may optionally include the apparatus of example 1, wherein the apparatus is to have a substantially cylindrical shape. Example 19 may optionally include the apparatus of example 1, wherein one or more of the first portion, the second portion, and the third portion are to communicate via wireless or wired signals.

Example 20 may optionally include a method comprising: capturing images, at a camera, of a surrounding area; determining a projection surface based at least in part on the captured images; causing adjustment to a location of a projector to cause projection of an image by the projector towards the determined projection surface, wherein a device with a first portion, a second portion, and a third portion is to comprise the projector in the first portion, the camera in the second portion, and one or more computing system components in the third portion, wherein at least the first portion and the second portion are to be rotationally engaged to allow for independent rotation of the first portion and the second portion. Example 21 may optionally include the method of example 20, wherein determining the projection surface is to be performed based at least in part on analysis of one or more of: one or more projection surface characteristics, distance between the projection surface and the projector, presence of obstructions on a light path between the projector and the projection surface, and presence of objects or writing on the projection surface. Example 22 may optionally include the method of example 20, further comprising detecting rotation of the camera or the projector at a photo interrupter sensor based at least in part on an open slot in a reference disk, wherein the reference disk rotates with the camera or the projector along a vertical axis or a horizontal axis. Example 23 may optionally include the method of example 20, further comprising carrying one or more wires through a hollow tube between one or more of the first portion, the second portion, and the third portion, wherein the hollow tube is disposed in a central location of the first, second, and third portions to allow for relative rotation of the first portion and the second portion. Example 24 may optionally include the method of example 20, further comprising one or more of the first portion, the second portion, and the third portion communicating via wireless or wired signals.

Example 25 includes one or more computer-readable medium comprising one or more instructions that when executed on at least one a processor configure the at least one processor to perform one or more operations to: capture images, at a camera, of a surrounding area; determine a projection surface based at least in part on the captured images; cause adjustment to a location of a projector to cause projection of an image by the projector towards the determined projection surface, wherein a device with a first portion, a second portion, and a third portion is to comprise the projector in the first portion, the camera in the second portion, and one or more computing system components in the third portion, wherein at least the first portion and the second portion are to be rotationally engaged to allow for independent rotation of the first portion and the second portion. Example 26 may optionally include the one or more computer-readable medium of example 25, further comprising one or more instructions that when executed on the at least one processor configure the at least one processor to perform one or more operations to cause determination of the projection surface based at least in part on analysis of one or more of: one or more projection surface characteristics, distance between the projection surface and the projector, presence of obstructions on a light path between the projector and the projection surface, and presence of objects or writing on the projection surface. Example 27 may optionally include the one or more computer-readable medium of example 25, further comprising one or more instructions that when executed on the at least one processor configure the at least one processor to perform one or more operations to cause detection of rotation of the camera or the projector at a photo interrupter sensor based at least in part on an open slot in a reference disk, wherein the reference disk rotates with the camera or the projector along a vertical axis or a horizontal axis. Example 28 may optionally include the one or more computer-readable medium of example 25, further comprising one or more instructions that when executed on the at least one processor configure the at least one processor to perform one or more operations to cause carrying of one or more wires through a hollow tube between one or more of the first portion, the second portion, and the third portion, wherein the hollow tube is disposed in a central location of the first, second, and third portions to allow for relative rotation of the first portion and the second portion.

Example 29 may optionally include an apparatus comprising means to perform a method as set forth in any preceding example. Example 30 comprises machine-readable storage including machine-readable instructions, when executed, to implement a method or realize an apparatus as set forth in any preceding example.

In various embodiments, the operations discussed herein, e.g., with reference to FIGS. 1-8, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a first portion to comprise a projector;
   a second portion to comprise a camera; and
   a third portion to comprise one or more computing system components,
   wherein at least the first portion and the second portion are to be rotationally engaged to allow for independent rotation of the first portion and the second portion, wherein two or more stepping motors are to cause rotation of the projector and the camera along a horizontal axis or a vertical axis.

2. The apparatus of claim 1, comprising logic to determine a projection surface based at least in part on images of a surrounding area to be captured by the camera, wherein the logic is to cause adjustment to a location of the projector to cause projection of an image by the projector towards the determined projection surface.

3. The apparatus of claim 2, wherein the logic is to determine the projection surface based at least in part on analysis of one or more of: one or more projection surface characteristics, distance between the projection surface and the projector, presence of obstructions on a light path between the projector and the projection surface, and presence of objects or writing on the projection surface.

4. The apparatus of claim 1, wherein the first, second, and third portions are to be stacked with the second portion to be located between the first portion and the third portion.

5. The apparatus of claim 1, wherein the camera is to comprise a Real Sense™ camera.

6. The apparatus of claim 1, wherein the first portion and the second portion are allowed to rotate along the same axis.

7. The apparatus of claim 1, wherein the two or more stepping motors are to cause the rotation via engagement of two or more gears, wherein each of the two or more gears is to be coupled between one of the two or more stepping motors and a carrier for the camera or a carrier for the projector.

8. The apparatus of claim 1, further comprising a hollow tube to carry one or more wires between one or more of the first portion, the second portion, and the third portion, wherein the hollow tube is to be disposed in a central location of the first, second, and third portions to allow for relative rotation of the first portion and the second portion.

9. The apparatus of claim 1, further comprising a reference disk having an open slot, wherein rotation of the projector or the camera is to be detected at a photo interrupter sensor based at least in part on an open slot in a reference disk, wherein the reference disk is to rotate with the camera or the projector along the vertical axis or the horizontal axis.

10. The apparatus of claim 1, further comprising one or more stops to limit the rotation of the first portion or the second portion.

11. The apparatus of claim 1, further comprising a battery to supply electrical power to one or more of: the projector, the camera, and the one or more computing system components.

12. The apparatus of claim 1, wherein the third portion is to be stationary while the first portion or the second portion are rotated.

13. The apparatus of claim 1, wherein the one or more computing system components are to be selected from a group comprising: one or more processor cores, one or more graphics processing units, memory, projector driver circuitry, a battery, a wired or wireless communication device, a speaker, a microphone, a power supply or converter, solar cells, and one or more input buttons.

14. The apparatus of claim 1, wherein the apparatus is to have a substantially cylindrical shape.

15. The apparatus of claim 1, wherein one or more of the first portion, the second portion, and the third portion are to communicate via wireless or wired signals.

16. A method comprising:
   capturing images, at a camera, of a surrounding area;
   determining a projection surface based at least in part on the captured images;
   causing adjustment to a location of a projector to cause projection of an image by the projector towards the determined projection surface,
   wherein a device with a first portion, a second portion, and a third portion is to comprise the projector in the first portion, the camera in the second portion, and one or more computing system components in the third portion, wherein at least the first portion and the second portion are to be rotationally engaged to allow for independent rotation of the first portion and the second portion, wherein two or more stepping motors cause rotation of the projector and the camera along a horizontal axis or a vertical axis.

17. The method of claim 16, wherein determining the projection surface is to be performed based at least in part on analysis of one or more of: one or more projection surface characteristics, distance between the projection surface and the projector, presence of obstructions on a light path between the projector and the projection surface, and presence of objects or writing on the projection surface.

18. The method of claim 16, further comprising detecting rotation of the camera or the projector at a photo interrupter sensor based at least in part on an open slot in a reference disk, wherein the reference disk rotates with the camera or the projector along the vertical axis or the horizontal axis.

19. One or more computer-readable medium comprising one or more instructions that when executed on at least one a processor configure the at least one processor to perform one or more operations to:
  capture images, at a camera, of a surrounding area;
  determine a projection surface based at least in part on the captured images;
  cause adjustment to a location of a projector to cause projection of an image by the projector towards the determined projection surface,
  wherein a device with a first portion, a second portion, and a third portion is to comprise the projector in the first portion, the camera in the second portion, and one or more computing system components in the third portion, wherein at least the first portion and the second portion are to be rotationally engaged to allow for independent rotation of the first portion and the second portion, wherein two or more stepping motors are to cause rotation of the projector and the camera along a horizontal axis or a vertical axis.

20. The one or more computer-readable medium of claim 19, further comprising one or more instructions that when executed on the at least one processor configure the at least one processor to perform one or more operations to cause determination of the projection surface based at least in part on analysis of one or more of: one or more projection surface characteristics, distance between the projection surface and the projector, presence of obstructions on a light path between the projector and the projection surface, and presence of objects or writing on the projection surface.

21. The one or more computer-readable medium of claim 19, further comprising one or more instructions that when executed on the at least one processor configure the at least one processor to perform one or more operations to cause detection of rotation of the camera or the projector at a photo interrupter sensor based at least in part on an open slot in a reference disk, wherein the reference disk rotates with the camera or the projector along the vertical axis or the horizontal axis.

* * * * *